US006867702B2

(12) United States Patent
Huber et al.

(10) Patent No.: US 6,867,702 B2
(45) Date of Patent: Mar. 15, 2005

(54) FREIGHT-LOADING SYSTEM FOR AN AIRCRAFT

(75) Inventors: Thomas Huber, Schliersee (DE); Benedikt Kieser, Hausham (DE); Matthias Urch, Egmating (DE); Thomas Perreiter, Fischbachau (DE); Stefan Auer, Fischbachau (DE)

(73) Assignee: Telair International GmbH, Miesbach (DE)

( * ) Notice: Subject to any disclaimer, the term of this patent is extended or adjusted under 35 U.S.C. 154(b) by 43 days.

(21) Appl. No.: 10/392,163

(22) Filed: Mar. 19, 2003

(65) Prior Publication Data

US 2003/0179079 A1 Sep. 25, 2003

(30) Foreign Application Priority Data

Mar. 19, 2002 (DE) .......................................... 102 12 123

(51) Int. Cl.[7] .............................................. G08B 21/00
(52) U.S. Cl. .................... 340/679; 340/680; 340/686.3; 198/782; 198/781.06; 198/788
(58) Field of Search ................................ 340/679, 680, 340/686.3; 198/782, 781.06, 788

(56) References Cited

U.S. PATENT DOCUMENTS

| | | | | |
|---|---|---|---|---|
| 2,944,297 A | * | 7/1960 | Maynard | 29/596 |
| 3,447,665 A | * | 6/1969 | Dioguardi et al. | 198/782 |
| 3,712,454 A | * | 1/1973 | McKee | 198/782 |
| 3,873,861 A | * | 3/1975 | Halm | 310/43 |
| 4,015,154 A | * | 3/1977 | Tanaka et al. | 310/42 |
| 4,225,926 A | | 9/1980 | Wendt | |
| 4,437,027 A | * | 3/1984 | Yamamoto et al. | 310/78 |
| 4,589,542 A | * | 5/1986 | Steadman | 198/782 |
| 4,720,646 A | * | 1/1988 | Torimoto | 310/71 |
| 4,864,510 A | | 9/1989 | Amlang et al. | |
| 5,183,150 A | * | 2/1993 | Chary et al. | 198/782 |
| 5,213,201 A | * | 5/1993 | Huber et al. | 198/781.06 |
| 5,661,384 A | | 8/1997 | Glibbery | |
| 6,135,269 A | * | 10/2000 | Huber et al. | 198/718 |
| 6,328,154 B1 | * | 12/2001 | Huber | 198/782 |

FOREIGN PATENT DOCUMENTS

| | | |
|---|---|---|
| DE | 42 00 985 | 8/1992 |
| DE | 44 27 696 A1 | 2/1996 |
| EP | 0 512 672 A1 | 11/1992 |
| EP | 0 769 450 A2 | 4/1997 |

* cited by examiner

*Primary Examiner*—Daryl C. Pope
(74) *Attorney, Agent, or Firm*—Merchant & Gould P.C.

(57) ABSTRACT

A freight-loading system in a cargo hold of an aircraft is provided that offers enhanced operating safety. The freight-loading system comprises a plurality of power drive units (PDUs), which can be actuated by control signals in such a way that items of freight can be maneuvered into or out of the cargo hold as well as within it. The power drive units (PDUs) are connected by control leads to control panels for actuation by personnel. A control maintenance computer (CMC) is provided and connected to the power drive units (PDUs) and the control panels, and is so designed that status information from the power drive units (PDUs) and the control panels can be read out, and that the power drive units (PDUs) and/or the control panels are controllable by the control maintenance computer (CMC).

10 Claims, 3 Drawing Sheets

FREIGHT-LOADING SYSTEM FOR AN AIRCRAFT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a freight-loading system for use in a cargo hold of an aircraft and in particular to a system in which there are provided a plurality of PDUs (power drive units) with rollers on which, in response to appropriate control signals, items of freight are conveyed into and out of the cargo hold.

BACKGROUND OF THE INVENTION

Modern cargo aircraft, in particular of the type Boeing 747, have extraordinarily large cargo holds into which containers are loaded. The loading situations can vary widely. The items being stored in the hold are not only containers tailored exactly to the dimensions of the hold, which can be locked into position at prespecified places by means of elements provided there. Instead, it is also necessary to load items, the sizes of which require that they be conveyed to special sites for storage. Very large items of freight can even need to be brought in through a side door and turned around within the cargo hold.

In all cases, however, the loading must proceed as rapidly as possible. The time taken for loading increases the costs to the operator of the cargo aircraft. When the conditions for loading are not as they should be, or when extreme environmental situations such as especially high or low temperatures, dust/sand, moisture etc. interfere with the function of operating systems needed for loading, in particular PDUs, the loading process can be delayed. In such cases it should always be kept in mind that not every airport has available a staff of well-trained operators with extensive experience. Hence even simple errors in operation, which can cause failure of entire systems, are not uncommon.

BRIEF SUMMARY OF THE INVENTION

It is an object of the present invention to provide a freight-loading system for a cargo hold of an aircraft, the use of which enables reliable loading and unloading of the cargo hold.

This object is achieved by a freight-loading system comprising a plurality of PDUs (power drive units with rollers) that can be actuated by control signals in such a way that items of freight can be maneuvered into the cargo hold or out of it as well as within the cargo hold, such that the PDUs are connected by control leads to control panels operable by the personnel, a Control Maintenance Computer (CMC) being provided and so designed and connected to the PDUs and the control panels that control information is read out from the PDUs and the control panels, and the PDUs and/or control panels can be controlled by the CMC.

This design makes it possible for the entire system to be monitored and malfunctions to be corrected or prevented, and even when the operators are insufficiently trained or make mistakes during the hectic loading process, reliable loading is ensured inasmuch as assistance, warning, monitoring, documentation and instructive functions are incorporated into the CMC.

Preferably, the PDUs and the control panels are connected by way of a CAN (Communication Area Network) bus. This kind of standardized bus makes it possible to interrogate all the systems independently of one another, with no need to increase the complexity of the cabling.

Preferably, the PDUs comprise sensors to keep track of their operating states and/or to determine whether items of freight are present or absent in the vicinity of the PDU concerned, and the sensors are connected to the control panels and/or the CMC. Such sensors in particular include, among other types, temperature sensors to enable monitoring of the operating temperature of the associated PDU, or that in a control panel, so as to prevent overheating. It is also possible in the CMC to monitor all the active elements in the cargo hold, in particular the PDUs or the panels, and to detect errors or malfunctions at an early stage. The maintenance personnel can thus be informed about such problems before they become critical.

The CMC preferably comprises display devices to display operating states and/or error states of the PDUs and/or the control panels. These preferably employ an "intelligent" representation, such that the operating states and/or malfunctions and errors are shown not according to their actual physical nature but rather, or where appropriate in addition, according to their effects. In particular, in the CMC memory devices are provided to store the sequences of operating and/or error states of the PDUs and/or control panels during a loading process. By means of such memory devices, the contents of which in particular can be read out only in response to special encoded commands, it is possible to carry out "learning processes". These include, firstly, detection of particularly heavy loading of regions in the cargo hold or of PDUs/panels at particular sites, so that if these show elevated failure rates they can be strengthened, restructured or differently installed. Another such learning process involves the detection of operational errors that are occurring with increased frequency, so that the appropriate instructions for using the system can then be passed on to the operating personnel. The use of these processes to document operating sequences for the purpose of ascribing liability should also not go unmentioned.

The CMC is preferably so constructed and so connected to the control panels that individual PDUs can be controlled despite discrepancies in the signals received from control panels, in particular can be driven or inactivated. That is, when groups of PDUs are being actuated in a particular way on the basis of control commands belonging to a preprogrammed operating sequence, it can happen that the entire operating sequence is interrupted on account of the failure of a single system (PDU or control panel). To deal with such cases an "override program" can be stored in the CMC, which causes a defective part of the system, in particular a PDU, to be inactivated (e.g., retracted), so that the remaining, correctly operating systems can take over the function of the defective system and the loading process can continue. This applies in particular to the especially critical region near the side door, in which items of freight must be rotated, for which purpose the PDUs provided here include some that can be rotated about their vertical axis. For this region, in addition to the sensors described above there are provided load sensors that measure the vertical loading of the PDUs and make this information available to the CMC as control signals.

Preferably the CMC comprises several, in particular three operational levels, differing in the specific groups of information details that can be read out and in the commands that can be executed. These three operational levels are preferably

- an operational level for the loading personnel (cargo loaders),
- an operational level for the airline's maintenance staff, and
- a "concealed" operational level for the manufacturer of the freight-loading system and his maintenance staff.

The cargo loader preferably receives all the information about the operating states of the system that is required for the purpose, and to a limited extent is allowed to override system errors. The cargo loader can also, for instance in case of failure of a PDU, retract this unit and subsequently continue the loading process without this PDU.

The airline's maintenance staff are called by the cargo loader as soon as an error or malfunction that he cannot correct occurs and is indicated by the CMC. In this case the maintenance person replaces the defective component of the freight system so that loading can proceed.

The uppermost level comprises the previously described functions, and can be used for long-term maintenance and also for improving the system, including training the personnel.

Preferably display devices are provided for the CMC and in particular are situated in the region of the side door to the cargo hold, because this is a central position from which the overall function of the freight-loading system can be monitored.

The CMC further preferably comprises memory devices so designed that possible failure situations and/or warning signals can be stored and read out, in such a way that procedures for assistance or for making repairs associated with the situations or signals are displayed at the same time. This is therefore, so to speak, a kind of expert system, which suggests possible ways of solving problems when they occur.

Preferably a display device is provided that is constructed in such a way that a plurality of PDUs and similar controllable devices can be represented so as to show their actual installation pattern in the cargo hold as well as their momentary operating states and malfunction or error states. With such a representational display, in particular on a flat panel, the viewer can very easily locate the malfunctioning units and correct the malfunction or make a detour around the defective elements.

The present invention will now be described by way of an exemplary embodiment with reference to the attached drawings.

DETAILED DESCRIPTION OF THE INVENTION

Figure 1:
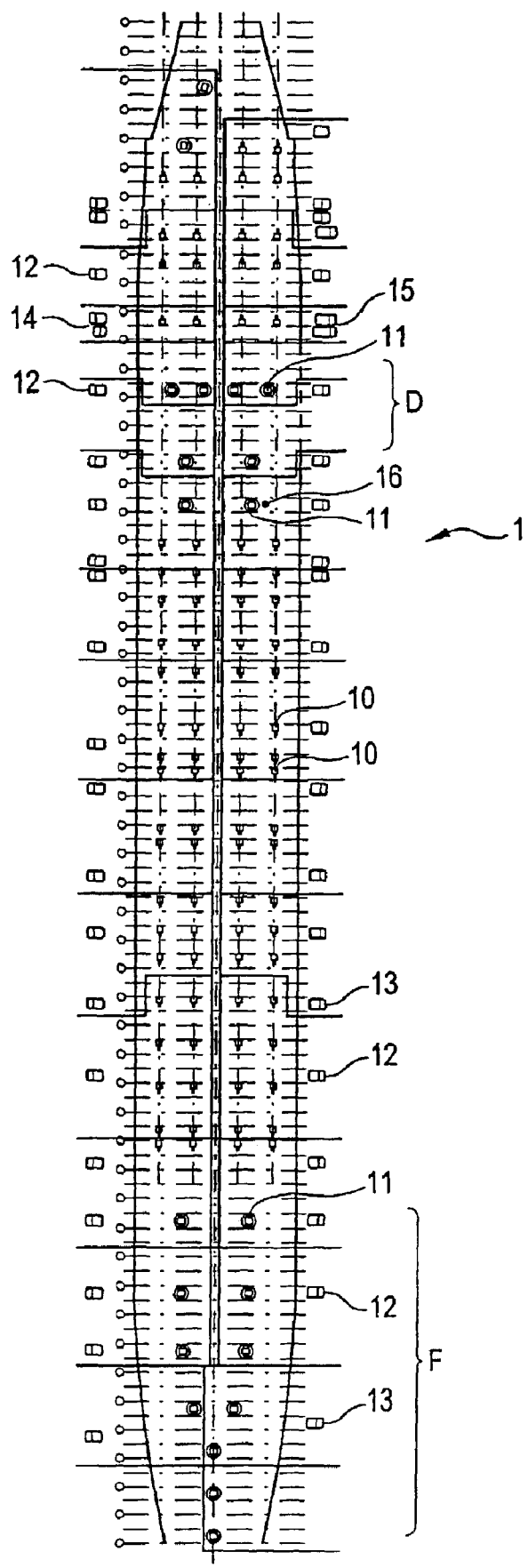
FIG. 1 is a schematic plan view of an aircraft cargo hold, in which the positions of control panels and similar control devices are indicated.

In the following description, the same reference numerals are used for identical parts or parts with identical actions.

According to FIG. 1, in a cargo hold 1 of an aircraft a plurality of PDUs (power drive units) 10 are provided for the longitudinal transport of an item of freight that has been transported into the cargo hold, as well as other equipment in particular places, namely a door in region D and, disposed in the front region F, PDUs 11 that can be rotated about their vertical axis.

Along the side walls of the cargo hold are mounted control panels 12 to 14—shown schematically in FIG. 1—adjacent which are mounted the PDUs 10, 11 for the loading and unloading of PDUs. Hence the operating personnel can go along with the items of freight and continually check that they are correctly positioned.

Figure 2:
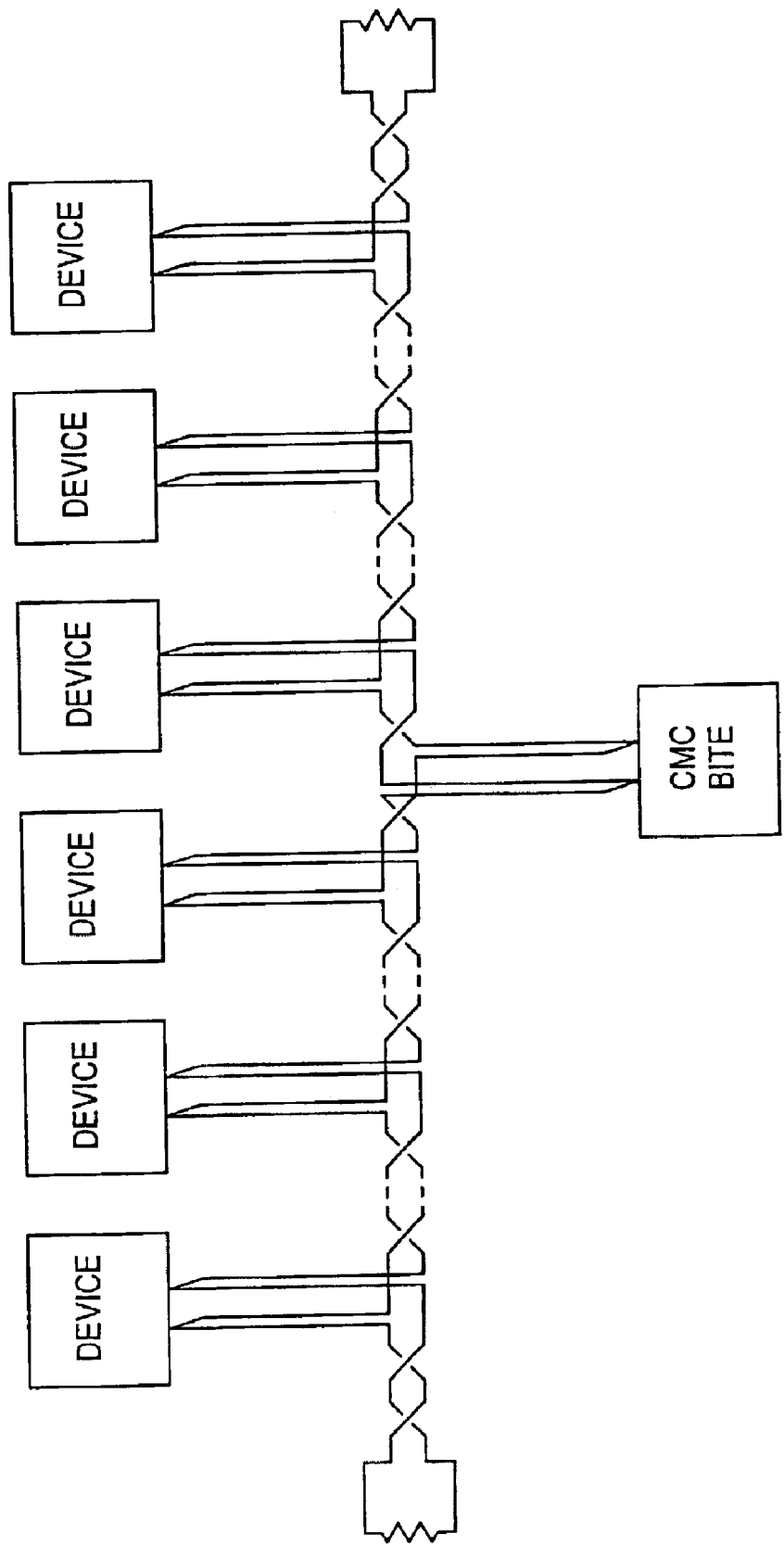
FIG. 2 is a block diagram of a wiring arrangement.

On the side wall behind the region D of the side door in the back of the cargo hold is disposed a CMC (control maintenance computer), which is connected to all the PDUs 10, 11 and panels 12 to 14. The connection is arranged as shown in FIG. 2 by a bus system coupled, by way of twisted-pair cabling with terminating resistors, to all active units ("DEVICE" in FIG. 2).

Figure 3:
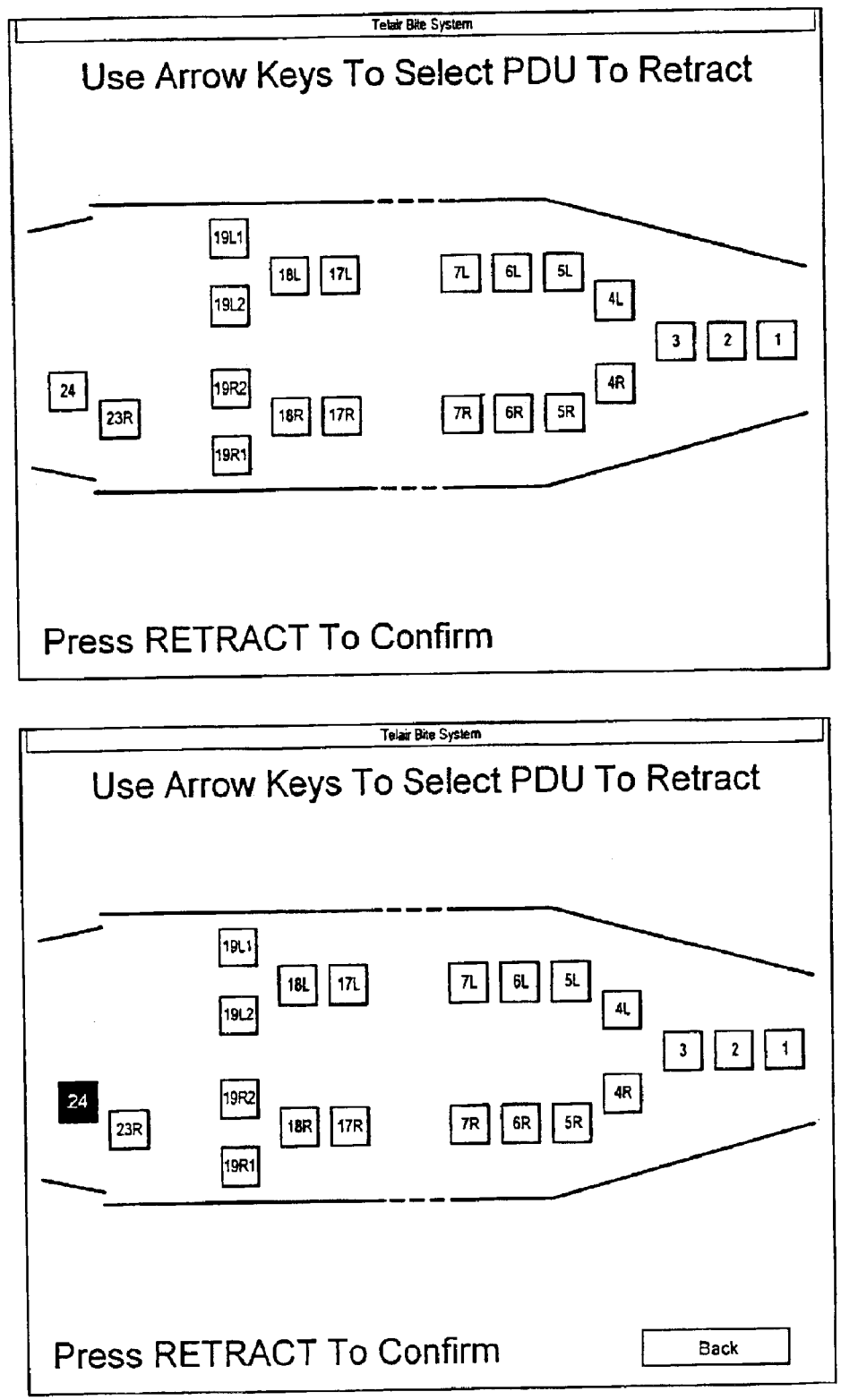
FIG. 3 shows two displays on a control panel in a particular control situation.

The CMC 15 and, where appropriate, additional control panels 12 to 14 comprise flat panels (monitor screens) to display the systems that can be activated. As shown in FIG. 3, the activatable units (PDUs) are preferably represented on the screen in the positions they actually occupy in the cargo hold 1. The parallelism (with omission of repeated systems in the middle region) of the arrangements in FIG. 1 and FIG. 3 is obvious.

If an operator notices (or if it is indicated by the CMC) that any of the PDUs have become nonfunctional and hence in their elevated state are interfering with the transport of an item of freight, then the relevant PDUs can be retracted by the operating personnel. It is also possible in this case to prepare in advance "automatisms" in the CMC such that in a particular loading situation PDUs that are not needed are turned off independently in case of malfunction. Furthermore, the CMC 15 is preferably so designed that on the same screens additional operating-state data (corresponding to the spatial arrangements) are displayed, so as to facilitate observation of the system as a whole.

For the sake of completeness it should also be mentioned that in the region of some of the PDUs 10, 11 sensors 16 are provided, which are likewise connected to the CMC 15 and are so designed that important operating parameters, in particular temperature, current-supply state, position or loading of the associated PDU can be detected. It is also possible to provide sensors 16 such that they can be used to detect whether items of freight are positioned in their vicinity, so that where appropriate the affected PDUs can be automatically elevated and activated in order to transport the freight further.

What is claimed is:

1. Freight-loading system for a cargo hold of an aircraft, comprising a plurality of power drive units with rollers (PDUs), which can be actuated by control signals in such a way that items of freight can be maneuvered into or out of the cargo hold as well as within it;

control panels for actuation by personnel;

control leads connecting the power drive units to the control panels;

a control maintenance computer (CMC) connected to the power drive units and to the control panels, and so designed that status information from the power drive units and the control panels can be read out and that at least one of the power drive units and the control panels are controllable by the control maintenance computer.

2. Freight-loading system as claimed in claim 1, wherein the power drive units (PDUs) and the control panels are connected to the control maintenance computer by a communication area network (CAN) bus.

3. Freight-loading system as claimed in claim 1, wherein the power drive units (PDUs) comprise sensors which are connected to at least one of the control maintenance computer (CMC) and the control panels, and each of which detects at least one of the presence and absence of items of freight in the region of the power drive unit associated therewith, and an operating state of said power drive unit.

4. Freight-loading system as claimed in claim 1, wherein the control maintenance computer (CMC) comprises display devices which can display operating states and any malfunctions of the power drive units (PDUs) and of the control panels.

5. Freight-loading system as claimed in claim 1, wherein the control maintenance computer (CMC) comprises memory devices for storing sequences of operating states including sequences of any malfunction states of the power drive units (PDUs) and of the control panels during a loading process.

6. Freight-loading system as claimed in claim 1, wherein the control maintenance computer (CMC) is designed and connected to the control panels such that individual power drive units (PDUs) can be controlled despite contradictory control signals from the control panels.

7. Freight-loading system as claimed in claim 1, wherein the control maintenance computer (CMC) has several operational levels in which the particular groups of information details that can be read out and the kinds of commands that can be executed differ from one another.

8. Freight-loading system as claimed in claim 1, wherein the control maintenance computer (CMC) comprises display devices for disposition in a region close to the doors of the cargo hold.

9. Freight-loading system as claimed in claim 1, wherein the CMC (15) comprises memory devices for storing and reading out possible malfunction situations and/or warning signals as well as the associated measures to be taken for the purpose of assistance or repair.

10. Freight-loading system as claimed in claim 1, comprising a display device designed to display a representation of a plurality of the power drive units (PDUs) in which their relative positions correspond to their actual positions in the cargo hold and their momentary operating states, including any states of malfunction, are indicated.

* * * * *